US012584586B2

(12) United States Patent
Liang et al.

(10) Patent No.: US 12,584,586 B2
(45) Date of Patent: Mar. 24, 2026

(54) TRIPOD

(71) Applicant: Dongguan YC Onion Network Technology Co., Ltd., Guangdong (CN)

(72) Inventors: Zhihao Liang, Guangdong (CN); Shuang Xiao, Guangdong (CN)

(73) Assignee: DONGGUAN YC ONION NETWORK TECHNOLOGY CO., LTD., Dongguan (CN)

( * ) Notice: Subject to any disclaimer, the term of this patent is extended or adjusted under 35 U.S.C. 154(b) by 245 days.

(21) Appl. No.: 18/553,103

(22) PCT Filed: Jan. 26, 2022

(86) PCT No.: PCT/CN2022/074083
§ 371 (c)(1),
(2) Date: Oct. 19, 2023

(87) PCT Pub. No.: WO2022/206157
PCT Pub. Date: Oct. 6, 2022

(65) Prior Publication Data
US 2024/0377019 A1     Nov. 14, 2024

(30) Foreign Application Priority Data

Mar. 31, 2021     (CN) .......................... 202110344963.3

(51) Int. Cl.
*F16M 11/16*          (2006.01)
*F16M 11/04*          (2006.01)
(Continued)

(52) U.S. Cl.
CPC ............. *F16M 11/16* (2013.01); *F16M 11/32* (2013.01); *G03B 17/561* (2013.01);
(Continued)

(58) Field of Classification Search
CPC ...... F16M 11/16; F16M 11/32; F16M 11/041; F16M 11/08; F16M 2200/024; G03B 17/561
See application file for complete search history.

(56) References Cited

U.S. PATENT DOCUMENTS

| | | | | |
|---|---|---|---|---|
| 9,903,528 | B1 * | 2/2018 | Hatch | ..................... F16M 11/26 |
| 2007/0090237 | A1 * | 4/2007 | Hsu | ......................... F16M 11/14 |
| | | | | 248/177.1 |

(Continued)

FOREIGN PATENT DOCUMENTS

| | | | | |
|---|---|---|---|---|
| CN | 209622400 | U | * 11/2019 | |
| CN | 110566778 | A | * 12/2019 | ................ F16B 7/14 |

(Continued)

OTHER PUBLICATIONS

Sachtler flowtech 75 tripod part No. S2051-0001, 2016 user guide, https://www.sachtler.com/wp-content/uploads/2023/06/sachtler-flowtech-75100-tripod-user-guide.pdf (Year: 2016).*

*Primary Examiner* — Terrell L Mckinnon
*Assistant Examiner* — Ding Y Tan
(74) *Attorney, Agent, or Firm* — Fideli Law PLLC; Qiang Li

(57) ABSTRACT

A tripod, comprising angle snap-fit structures (32); rotating members (33), each of the rotating member (33) having one end rotatably connected to each angle snap-fit structure, and the other end connected to each support leg (1) of the tripod; angle control members (34) which are matched and snap-fitted with the angle snap-fit structures so as to lock the corresponding angle of the rotating members rotating relative to the angle snap-fit structures; support legs, each of the support legs comprising two or more leg sections (1a, 1b, 1c) and expandable assemblies (2) mounted on the second leg section (1b) and the third leg section (1c), wherein each leg section can axially move relative to one or more of other (Continued)

leg sections, and the expandable assemblies can perform position locking and position releasing by means of expansion and contraction. The structure can implement quick adjustment of the angle and length of the support legs.

9 Claims, 12 Drawing Sheets

(51) Int. Cl.
     *F16M 11/08*           (2006.01)
     *F16M 11/32*           (2006.01)
     *G03B 17/56*           (2021.01)

(52) U.S. Cl.
     CPC ............ *F16M 11/041* (2013.01); *F16M 11/08* (2013.01); *F16M 2200/024* (2013.01)

(56)               References Cited

U.S. PATENT DOCUMENTS

| | | | |
|---|---|---|---|
| 2019/0003635 A1 * | 1/2019 | Li | ......................... F16M 11/242 |
| 2019/0101239 A1 * | 4/2019 | Li | ......................... G03B 17/561 |

FOREIGN PATENT DOCUMENTS

| | | | | |
|---|---|---|---|---|
| CN | 112145520 B | * | 6/2022 | .............. F16B 7/149 |
| EP | 2551532 A2 | * | 1/2013 | ............. F16M 11/32 |
| WO | WO-2015140993 A1 | * | 9/2015 | ............. F16B 7/1463 |
| WO | WO-2016131102 A1 | * | 8/2016 | ............. F16M 11/32 |

* cited by examiner

TRIPOD

FIELD OF INVENTION

The present invention relates to the technical field of photographic equipment. In particular, it relates to a tripod.

BACKGROUND OF THE INVENTION

A tripod is used to stabilize a camera to attain some photographic effects, so the positioning of the tripod is essential. Usually, people tend to ignore the importance of the tripod when they use digital cameras to take pictures. In fact, photo shooting with the help of the tripod is often indispensable, such as in star trail shooting, running water shooting, night shooting, macro shooting, and other aspects. The role of the tripod, no matter for an amateur user or a professional user cannot be ignored, and its main role is to stabilize the camera; but the general structure of the tripod telescopic legs have multiple joints, and the joints must be gradually locked or loose, making inconvenient as it must be operated repeatedly, and the existing tripod telescopic leg structure is complicated and cumbersome to operate.

SUMMARY OF THE INVENTION

The present invention provides a tripod aimed at the problems of the prior art with a novel structure and ingenious design that achieves the angle adjustment of the support legs; compared with the traditional method of gradually locking and loosening multiple joints for position locking and releasing, the present invention is simple and quick in operation and is advantageous for an aesthetically pleasing appearance.

To address the above technical problems, the present invention employs the following technical solution:

The present invention provides a tripod comprising:

an angle snap-fit structure fixedly is disposed on a seat of the tripod; wherein said seat is provided with a tripod center seat mechanism for mounting photographic equipment;

a rotating member, one end of the rotating member is rotatably connected to said angle snap-fit structure and the other end of the rotating member is connected to a support leg of the tripod;

an angle control member is slidably disposed on the rotating member; and said angle control member is cooperatively snap-fitting with said angle snap-fit structure to lock a corresponding angle of rotation of said rotating member relative to said angle snap-fit structure;

said support leg comprises two or more leg sections, wherein each leg section is axially movable relative to one or more of the other leg sections to extend or shorten said support leg;

said support leg further comprises an expandable assembly mounted on the second leg section and the third leg section, wherein said expandable assembly is capable of performing operations of an expansion and a contraction for position locking and releasing;

said support leg further comprises a control assembly mounted on the first leg section, wherein said control assembly is used to control said expandable assembly to expand or contract;

said support leg further comprises a transmission lever, and said control assembly is connected to said expandable assembly by means of said transmission lever and transmitting therebetween.

Wherein, said angle snap-fit structure is provided with multiple snap catches; and said angle control member is provided with a coupling member;

said coupling member is capable of abutting against any one of said snap catches to lock the rotating member at a corresponding angle of rotation relative to the angle snap-fit structure;

said rotating member is provided with a locking screw, and said angle control member is provided with a movable guide groove therethrough, and said locking screw passing through said movable guide groove of said angle control member and being screwed to said rotating member, and said locking screw is provided with multiple disc spring spacers between said locking screw and said angle control member for use in pressing is against said angle control member.

Wherein, said expandable assembly comprises a transmission seat, an extrusion sleeve, and a fixed seat, wherein said fixed seat is threadedly coupled to a periphery of the lower end of said transmission seat and has multiple expandable blocks distributed at equal intervals around a periphery of said fixed seat, wherein the multiple expandable blocks are provided with elastic sleeves around a periphery of said expandable blocks. The extrusion sleeve is movably coupled to a periphery of said transmission seat, and the top of said transmission seat is provided with a pressing deck that is slidably coupled to the top of said extrusion sleeve, and said extrusion sleeve is used to extrude the expandable block to cause the expandable block to expand outwardly, and a friction spacer is provided on the outer wall of said expandable block.

Wherein, multiple first extrusion bevels are provided at equal intervals around a periphery of a lower edge of said extrusion block, and the first extrusion bevels correspond to the expandable blocks one by one.

Wherein, the lower outer edge of said transmission seat is provided with an annular table, and multiple second extrusion bevels are provided at equal intervals around an outer periphery of an upper edge of said annular table, and the second extrusion bevels correspond to the expandable blocks one by one.

Wherein, an upper end and a lower end of the inner sidewall of the expandable block are provided with an abutting bevel.

Wherein, an upper surface of said extrusion sleeve is provided with an upper annular groove, which is rotatably provided with multiple balls, and a lower surface of said pressing deck is provided with a lower annular groove, wherein said upper annular groove corresponds to the lower annular groove, and the multiple balls are slidably coupled to the lower annular groove.

Wherein, said control assembly comprises a control base, and a control shaft is rotatably mounted on the control base, and a control bevel gear is socketed on a periphery of the said control shaft, and a pivot handle is coupled to said control shaft;

said transmission lever is provided with a transmission bevel gear at the top of said transmission lever which is connected to said control bevel gear in an engaging transmission;

said pivot handle is positioned on a periphery of said control base, and said pivot handle is provided with a positioning assembly and a first housing accommodating said positioning assembly, and said positioning assembly comprises a first spring and a steel ball, wherein said first spring is connected to the inner wall of the first housing and the outer surface of the steel ball at its two ends, respectively. The front end of said steel ball protrudes from said first housing, and the steel ball is slidably connected to the outer wall of the control base, and said control base is provided with a snap-in recess on the outer wall for snap-in engagement with said steel ball;

the outer wall of said control base is also provided with a second housing, wherein said second housing is equipped with a limiting assembly for limiting the pivot handle, and said limiting assembly comprises a second spring and a limiting block, wherein the two ends of said second spring are connected to the inner wall of the second housing and one end of the limiting block, respectively, and the other end of the limiting block protrudes from said second housing and is used for limiting the pivot handle by connecting to said pivot handle.

Wherein, said tripod center seat mechanism comprises a locking assembly, a center seat bushing, a movable swing seat, a locking block, and a connecting rod, wherein the center seat bushing is mounted on the seat, and the movable swing seat is movably mounted on the top of said center seat bushing. A first through hole is provided in said movable swing seat and the connecting rod is threaded through the first through hole; wherein the lower end of the connecting rod is connected to said locking assembly, and the upper end of the connecting rod is connected to the locking block, wherein the width of said locking block is greater than the width of the first through hole.

Wherein, said locking assembly comprises a slider and a screw, wherein said slider is provided with a third extrusion bevel on both sides, and said screw is rotatably installed in said center seat bushing and threaded in said connecting rod, and said locking block is connected to said slider through the connecting rod. The screw is threaded with a first compression block and a second compression block, and said first compression block and said second compression block is located on both sides of the connecting rod, respectively, and both of said first compression block and said second compression block is provided with a fourth extrusion bevel cooperating with said third extrusion bevel, and said screw is provided with a right-hand threaded section and a left-hand threaded section, wherein said first compression block and second compression block are threaded with the right-hand threaded section and the left-hand threaded section, respectively.

Beneficial Effects of the Present Invention

The structural design of the present invention is novel and ingenious. When the tripod is used, the angle adjustment of the support leg can be achieved by rotating the support leg to a selected position and then snapping the angle control member into said angle snap-fit structure; wherein, under the structure of the support leg, the transmission lever is driven to rotate by the operation of the control assembly, and the expansion or contraction of the expandable assembly is driven by the transmission lever to achieve the locking and releasing of the position; wherein each leg section is axially movable relative to one or more of the other leg sections to lengthen or shorten said support leg. As compared to the conventional method of gradually locking and loosening multiple joints for positional locking and releasing, the present invention is simple and efficient in operation and is advantageous for an aesthetically pleasing appearance.

Figure 1:
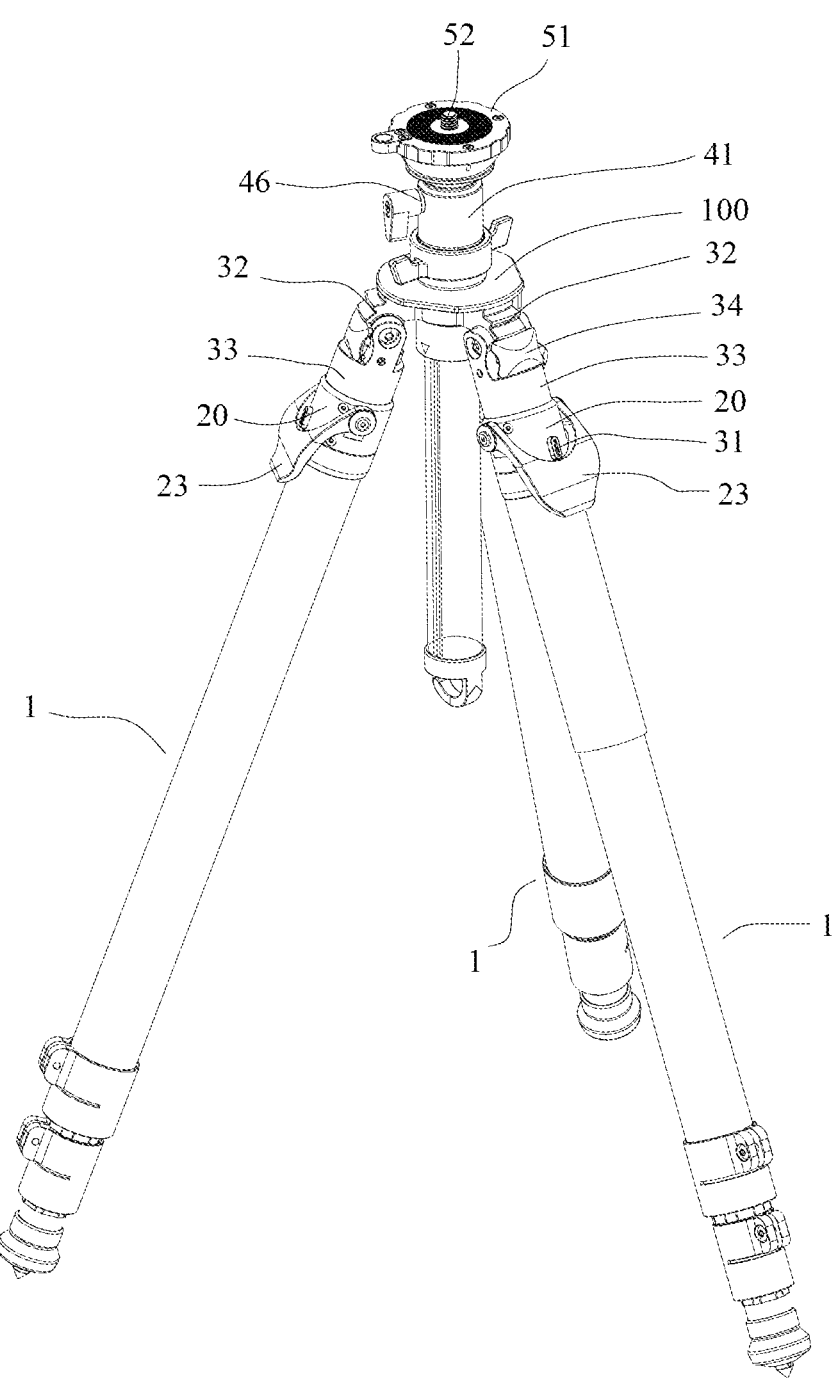
FIG. 1 is a schematic diagram of the structure of a tripod of the present invention.
Figure 2:
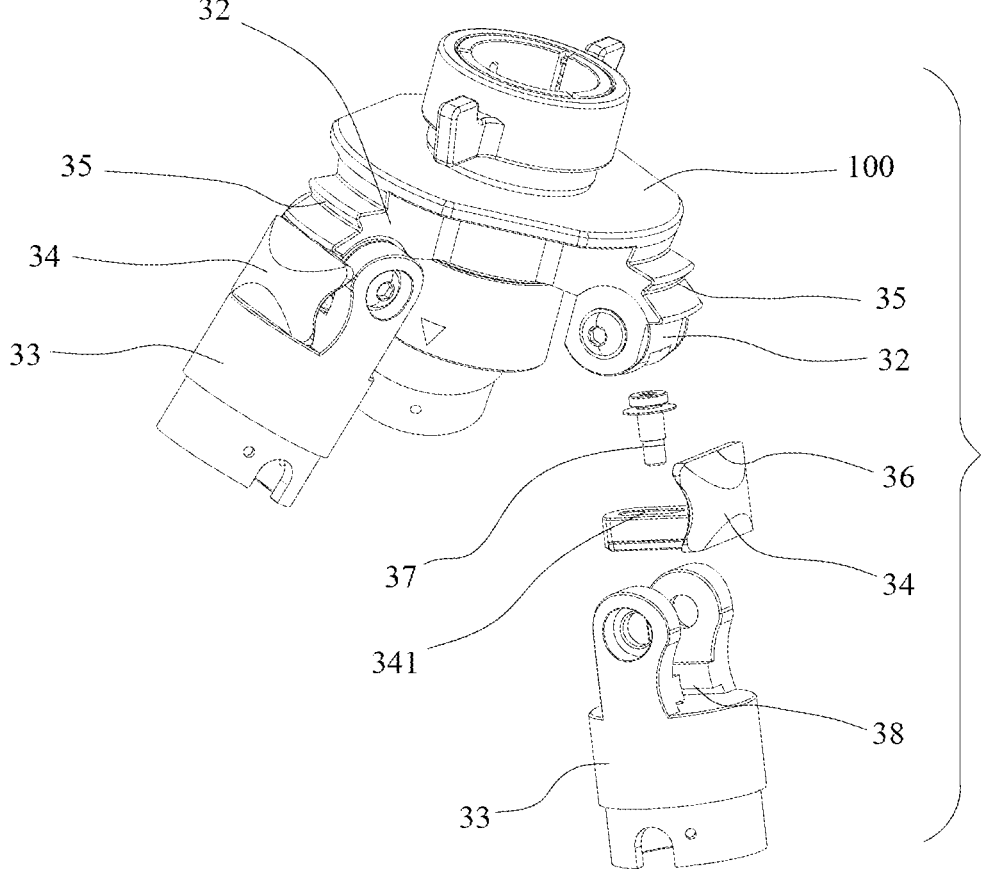
FIG. 2 is a partially exploded diagram of the structure of the present invention after hiding the support leg.
Figure 3:
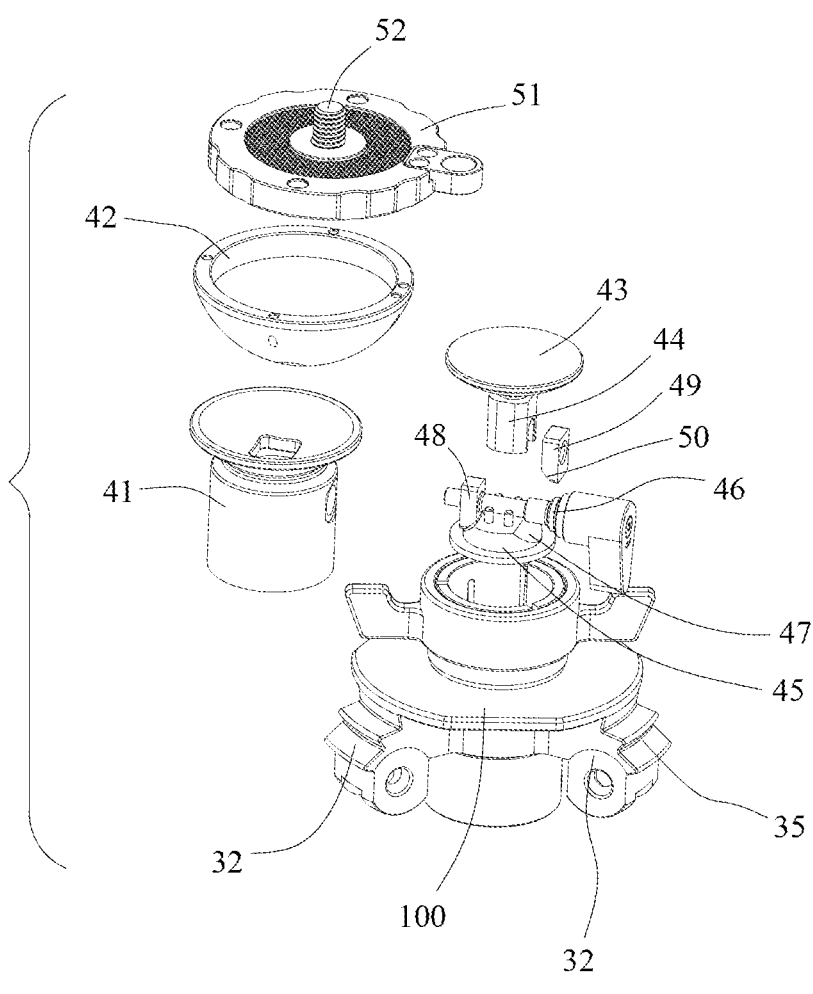
FIG. 3 is an exploded diagram of the structure of the present invention after hiding the support leg, the rotating member, and the angle control member.
Figure 4:
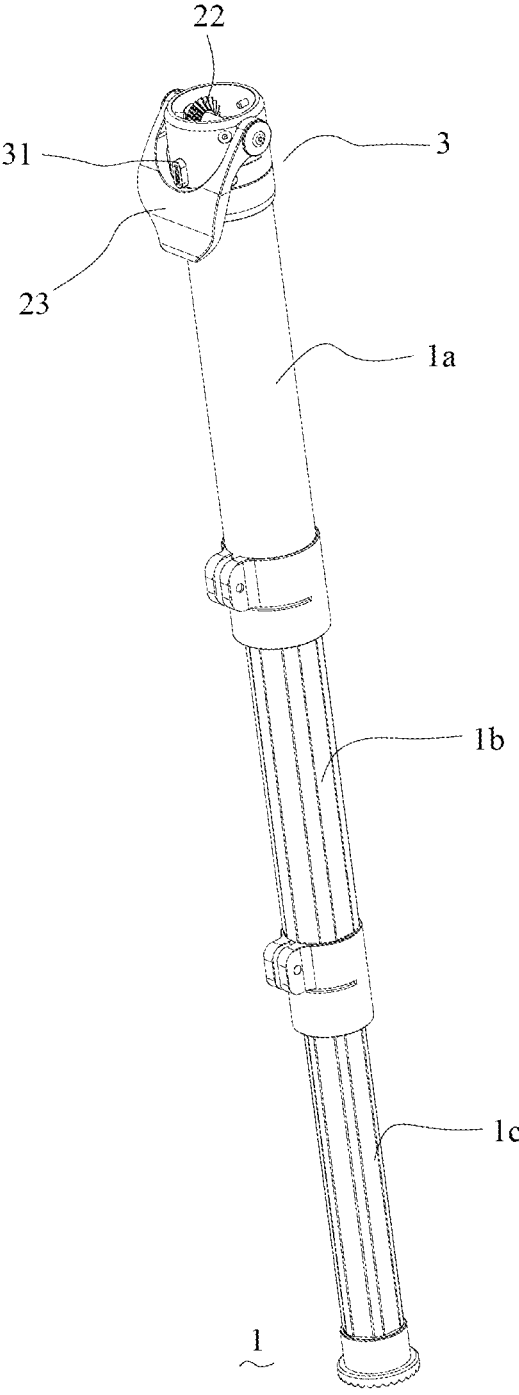
FIG. 4 is a schematic diagram of the structure of the support leg of the present invention.
Figure 5:
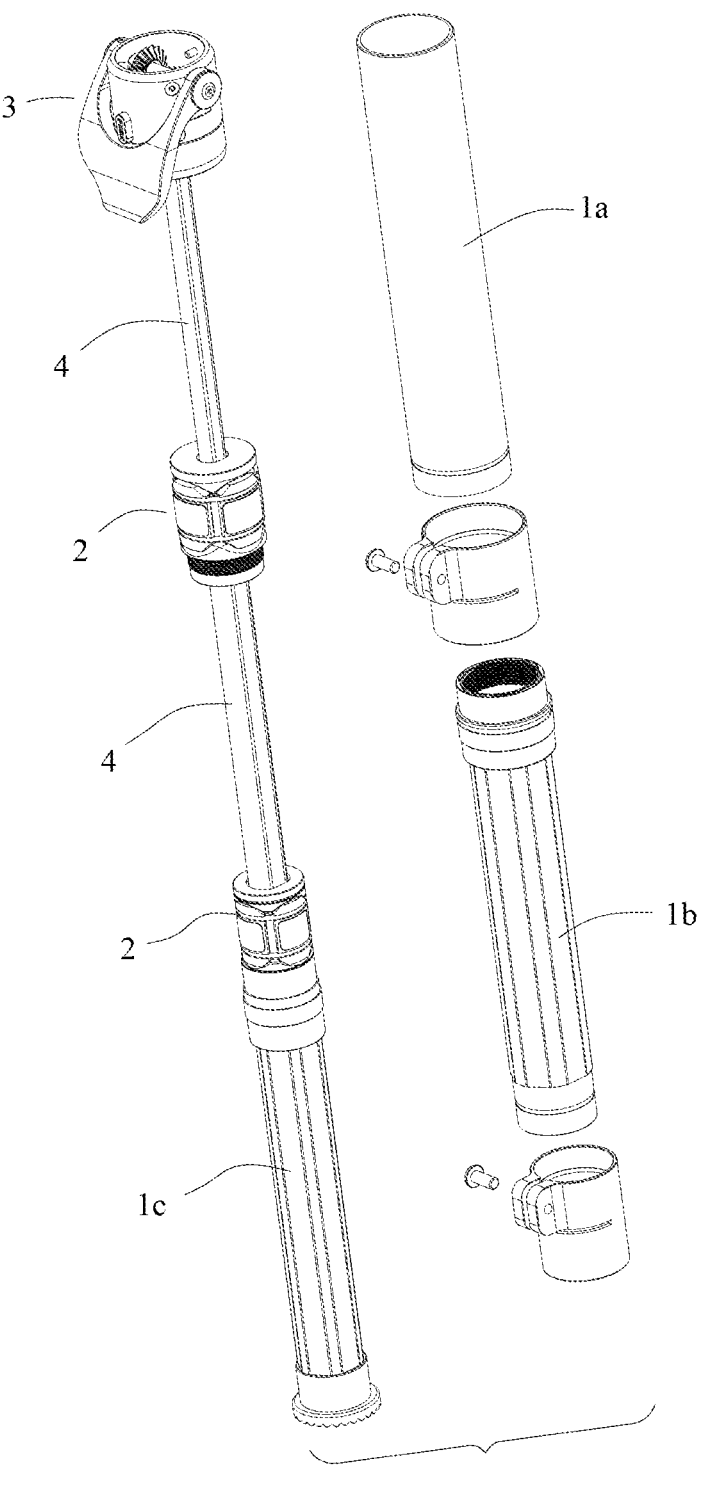
FIG. 5 is an exploded diagram of the structure of the support leg of the present invention.
Figure 6:
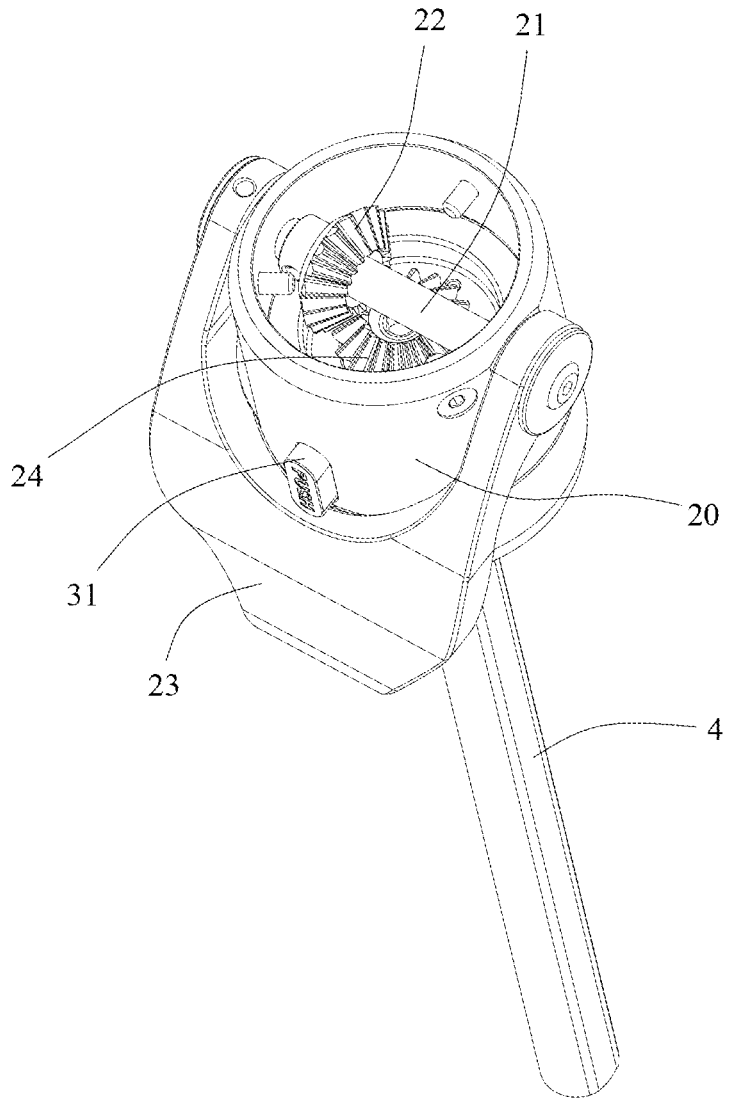
FIG. 6 is a schematic diagram of the structure of the control assembly cooperating with the transmission lever of the present invention.
Figure 7:
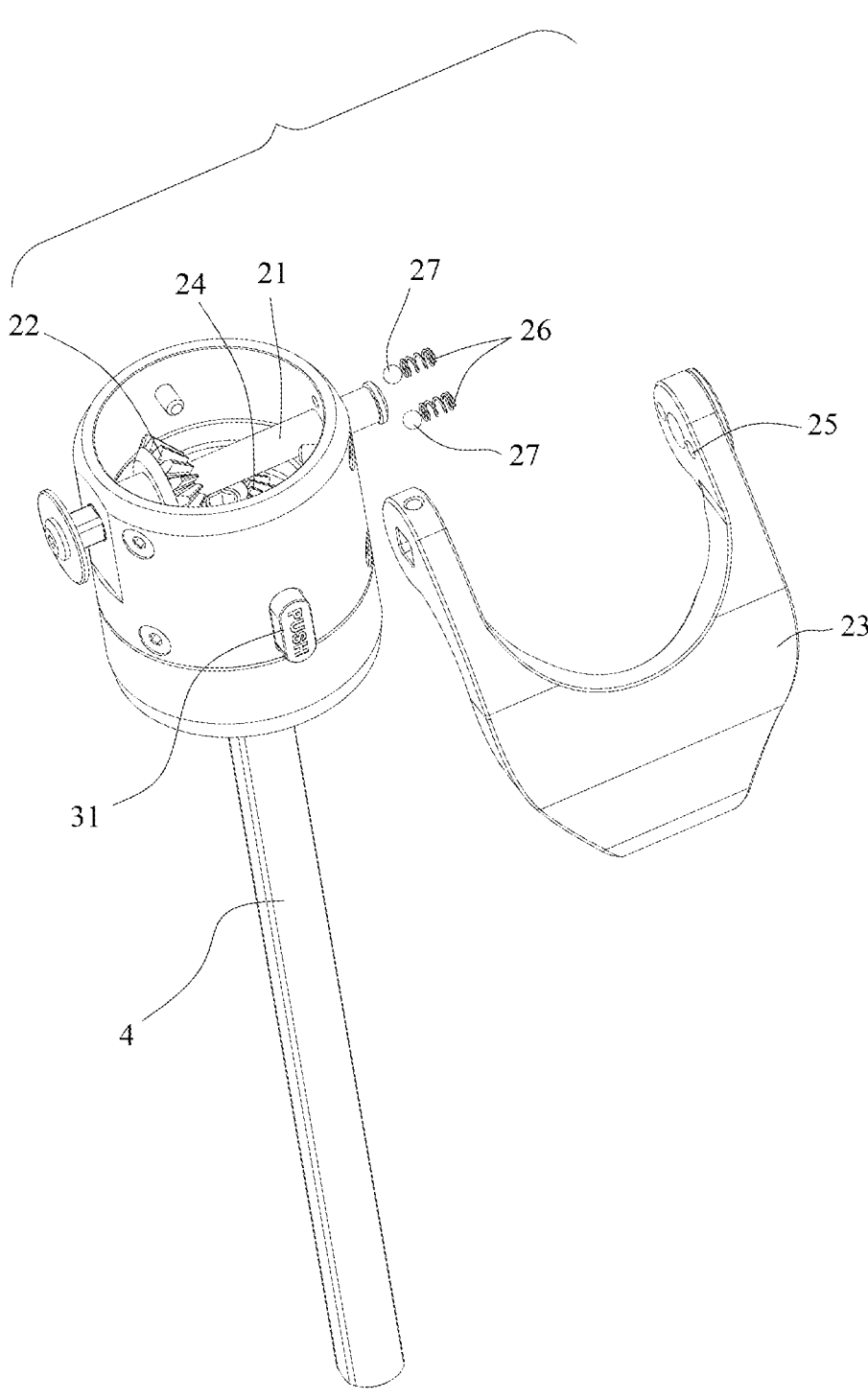
FIG. 7 is an exploded diagram of the structure of FIG. 6.
Figure 8:
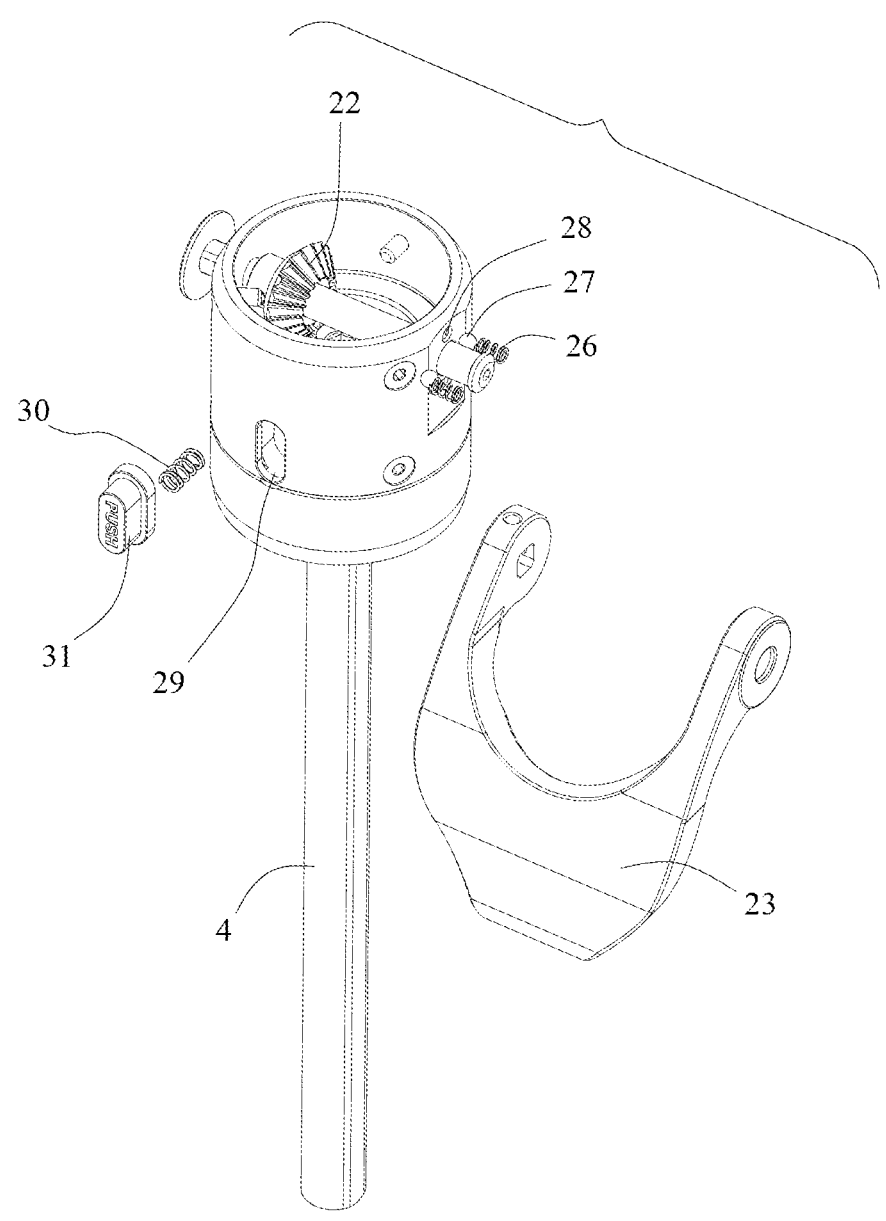
FIG. 8 is an exploded diagram of the structure of FIG. 6 in another view.
Figure 9:
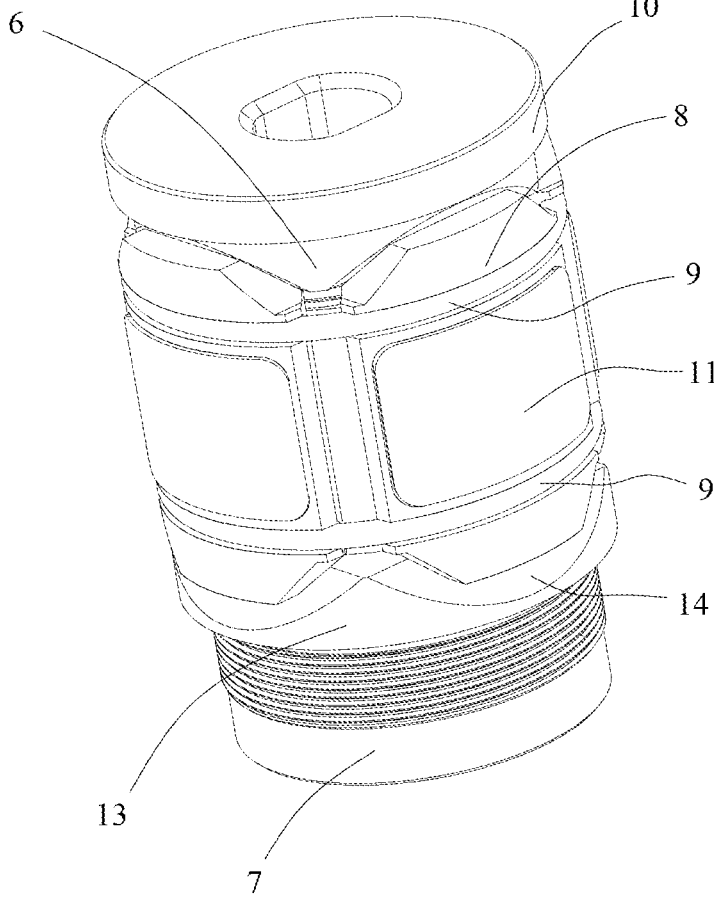
FIG. 9 is a schematic diagram of the structure of the expandable assembly of the present invention.
Figure 10:
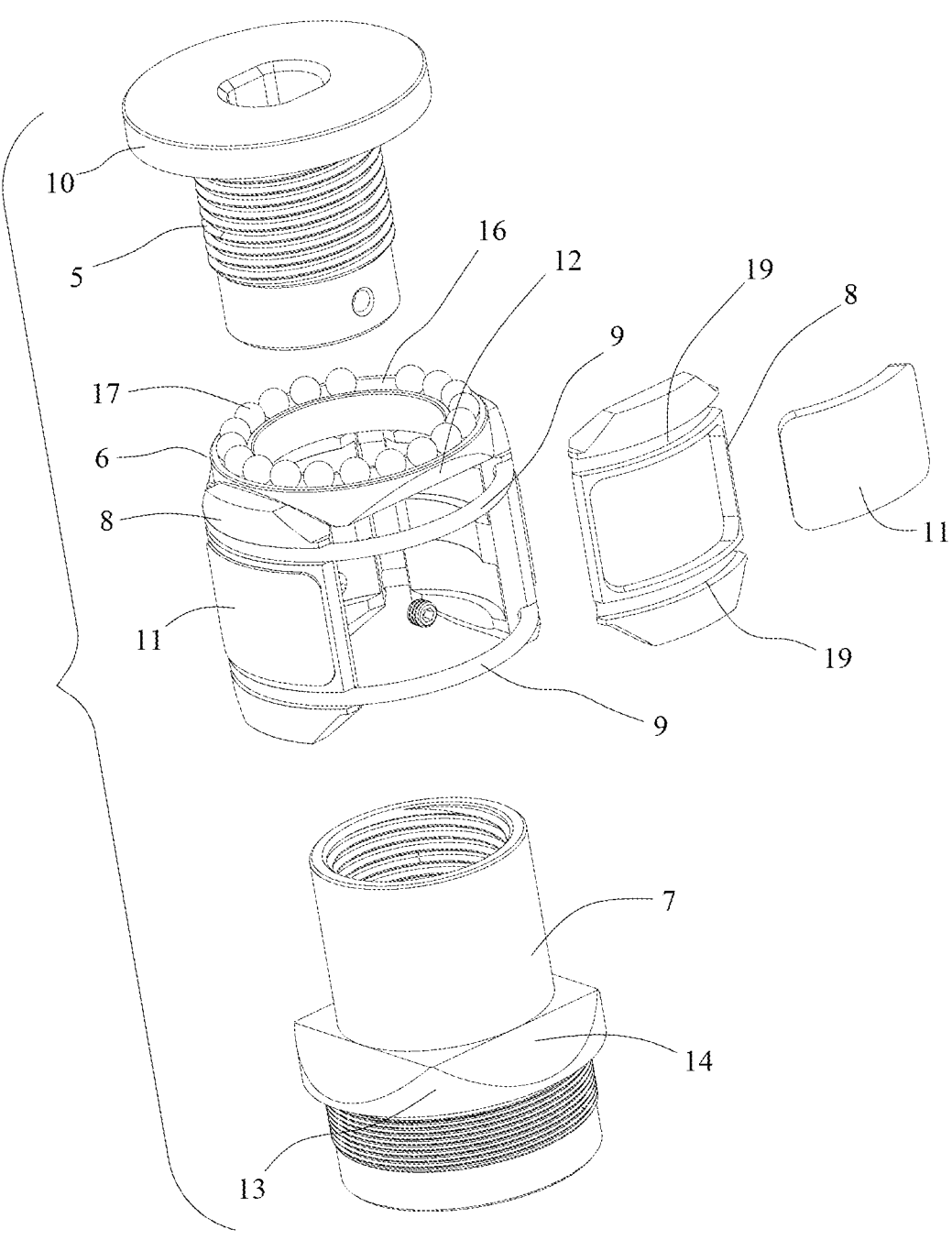
FIG. 10 is an exploded diagram of the structure of the expandable assembly of the present invention.
Figure 11:
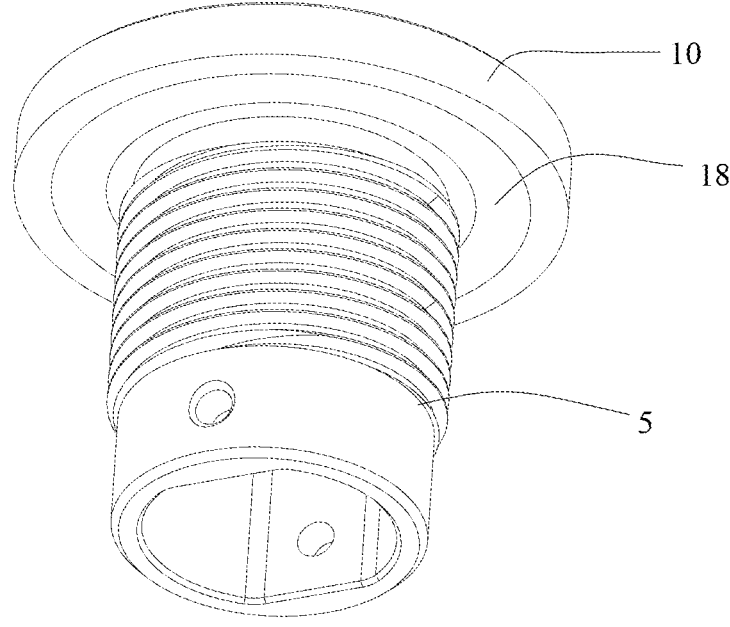
FIG. 11 is a schematic diagram of the structure of the transmission seat of the present invention.
Figure 12:
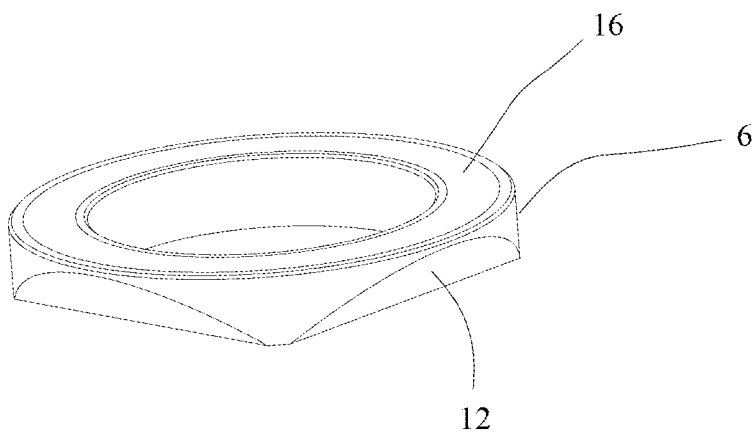
FIG. 12 is a schematic diagram of the structure of the extrusion sleeve of the present invention.
Figure 13:
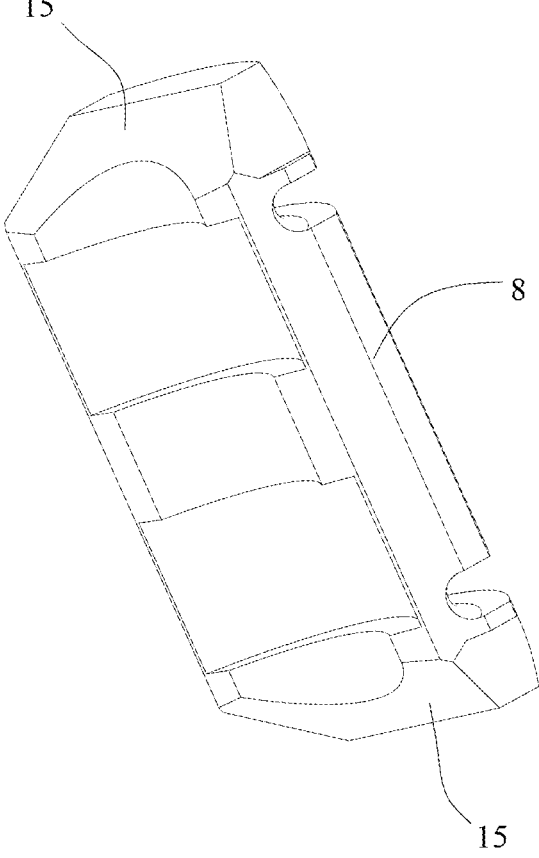
FIG. 13 is a schematic diagram of the structure of the expandable block of the present invention.

The accompanying drawings reference numbers in FIGS. 1 through 13 include:

1, support leg; 1a, first leg section; 1b, second leg section; 1c, third leg section; 100, seat; 2, expandable assembly; 3, control assembly; 4, transmission lever; 5, transmission seat; 6, extrusion sleeve; 7, fixed seat; 8, expandable block; 9, elastic sleeve; 10, pressing deck; 11, friction spacer; 12, first extrusion bevel; 13, annular table; 14, second extrusion bevel; 15, abutting bevel; 16, upper annular groove; 17, ball; 18, lower annular groove; 19, accommodating groove; 20, control base; 21, control shaft; 22, control bevel gear; 23, pivot handle; 24, transmission bevel gear; 25, first housing; 26, first spring; 27, steel ball; 28, snap-in recess; 29, second housing; 30, second spring; 31, limiting block; 32, angular snap-fit structure; 33, rotating member; 34, angle control member; 341, movable guide groove; 35, snap catch; 36, coupling member; 37, locking screw; 371, disc spring spacer; 38, movable groove; 41, center seat bushing; 42, movable swing seat; 43, locking block; 44, connecting rod; 45, slider; 46, screw; 47, third extrusion bevel; 48, first compression block; 49, second compression block; 50, fourth extrusion bevel; 51, top plate; 52, mounting screw.

DETAILED DESCRIPTION OF THE PREFERRED EMBODIMENTS

In order to facilitate the understanding of those skilled in the art, the present invention will be further described below in conjunction with the embodiments and the accompanying drawings, however the references to the embodiments are not intended to be a limitation of the present invention. The following is a detailed description of the present invention in conjunction with the accompanying drawings.

A tripod, as shown in FIGS. 1 to 13, comprising:

an angle snap-fit structure 32 is fixedly disposed on a seat 100 of the tripod; wherein said seat 100 is provided with a tripod center seat mechanism for mounting photographic equipment;

a rotating member 33, one end of the rotating member 33 is rotatably connected to said angle snap-fit structure 32 and the other end of the rotating member 33 is connected to a support leg 1 of the tripod;

an angle control member 34 is slidably disposed on the rotating member 33; and said angle control member 34 is cooperatively snap-fitting with said angle snap-fit structure 32 to lock a corresponding angle of rotation of said rotating member 33 relative to said angle snap-fit structure 32;

said support leg 1 comprises two or more leg sections 1a, 1b, and 1c, wherein each leg section 1a, 1b, or 1c is axially movable relative to one or more of the other leg sections 1a, 1b, and 1c to lengthen or shorten said support leg 1;

said support leg 1 further comprises an expandable assembly 2 mounted on the second leg section 1b and the third leg section 1c, wherein said expandable assembly 2 is capable of performing operations of an expansion and a contraction for position locking and releasing;

said support leg 1 further comprises a control assembly 3 mounted on the first leg section 1a, wherein said control assembly is used to control said expandable assembly 2 to expand or contract;

said support leg 1 further comprises a transmission lever 4, and said control assembly 3 is connected to said expandable assembly 2 by means of said transmission lever 4 and transmitting therebetween.

Specifically, the structural design of the present invention is novel and ingenious. When the tripod is used, the angle adjustment of the support leg 1 can be achieved by rotating the support leg 1 to a selected position and then snapping the angle control member 34 into said angle snap-fit structure 32; wherein, under the structure of the support leg 1, the transmission lever 4 is driven to rotate by the operation of said control assembly 3, and the expansion or contraction of the expandable assembly 2 is driven by the transmission lever 4 to achieve the locking and releasing of the position; wherein, each leg section is axially movable relative to one or more of the other leg sections to lengthen or shorten said support leg 1. In one embodiment, the control assembly 3 is mounted on the first leg section 1a, and the second leg section 1b and the third leg section 1c are both mounted with the expandable assembly 2 with the second leg section 1b slidably socketed within the first leg section 1a and the third leg section 1c slidably socketed within the second leg section 1b, wherein the control assembly 3 is linked to the expandable assembly 2 via the transmission lever 4; when the expandable assembly 2 is contracted, the second leg section 1b is axially slid relative to the first leg section 1a, and the third leg section 1c is axially slid relative to the second leg section 1b to facilitate the length adjustment of the support leg 1. After the length is adjusted, the control assembly 3 drives the transmission lever 4 to allow the expandable assembly 2 to expand and press tightly against the inner wall of the first leg section 1a and the inner wall of the second leg section 1b so that the second leg section 1b is locked relative to the position of the first leg section 1a, and the third leg section 1c is locked relative to the position of the second leg section 1b to achieve the adjusting and locking effect. The structural design is novel and ingenious, as compared to the conventional method of gradually locking and loosening multiple joints for positional locking and releasing, the present invention is simple and efficient in operation and is advantageous for aesthetically pleasing appearance.

In the tripod of the present embodiment, three said angle snap-fit structures 32 are equally spaced around a periphery of the seat 100; and three of the corresponding rotating member 33, the support leg 1, and the angle control member 34 are provided to achieve the function of the tripod.

Further, in the tripod described in the present embodiment, the angle snap-fit structure 32 is provided with multiple snap catches 35; and said angle control member 34 is provided with a coupling member 36; all the snap catches 35 are formed in the shape of stepped teeth; and each tooth is formed as a snap catch 35, and the outer teeth of all the teeth are distributed on the same arc;

said coupling member 36 is capable of abutting against any one of said snap catches 35 to lock the rotating member 33 at a corresponding angle of rotation relative to the angle snap-fit structure 32;

said rotating member 33 is provided with a locking screw 37, and said angle control member 34 is provided with a movable guide groove 341 therethrough, and said locking screw 37 passes through said movable guide groove 341 of said angle control member 34 and is screwed to said rotating member 33, and said locking screw 37 is provided with multiple disc spring spacers 371 between said locking screw 37 and said angle control member 34 for use in pressing against said angle control member 34. In addition, said rotating member 33 is provided with a movable groove 38 for accommodating said angle control member 34.

Specifically, under the above structural configuration, pulling the angle control member 34 plays a guiding role under the cooperation of the locking screw 37 and the movable guide groove 341, when the locking screw 37 slides out of the movable groove 38, rotating said rotating member 33 can adjust the angle of the support leg 1, and aligning the coupling member 36 with the corresponding snap catch 35, and then pushing the angle control member 34 into the movable groove 38 so that the angle control member 34 can be restored. The coupling member 36 is locked in correspondence with the snap catch 35, and the angle control member 34 is compressed under the elasticity of the disc spring spacer 371 to prevent the angle control member 34 from loosening, then an angle locking of the support leg 1 can be achieved.

In the tripod of the present embodiment, said expandable assembly 2 comprises a transmission seat 5, an extrusion sleeve 6, and a fixed seat 7, wherein said fixed seat 7 is threadedly coupled to a periphery of the lower end of said transmission seat 5 and has multiple expandable blocks 8 distributed at equal intervals around a periphery of said fixed seat 7, wherein the multiple expandable blocks 8 are provided with elastic sleeves 9 around a periphery of said expandable blocks 8; and the extrusion sleeve 6 is movably coupled to the periphery of said transmission seat 5, wherein a top of said transmission seat 5 is provided with a pressing deck 10 that is slidably coupled to a top of said extrusion sleeve 6, and said extrusion sleeve 6 is used to extrude the expandable block 8 to cause the expandable block 8 to expand outwardly, and a friction spacer 11 is provided on an outer wall of said expandable block 8. Said friction spacer 11 may be a rubber spacer, a plastic spacer, an anti-abrasive fabric spacer, and the like, and is not specifically limited herein.

Specifically, when the control assembly 3 drives said expandable assembly 2 to act and the expandable assembly 2 is in an opening status, the transmission lever 4 rotates in one direction to drive the transmission seat 5 to rotate relative to the fixed seat 7, and through the pressing deck 10 is moved downward to push the extrusion sleeve 6 downward to extrude the expandable block 8 to expand outward, and the friction spacer 11 on the outer wall of the expandable block 8 is frictionally pressed against the inner wall of the first leg section 1a and the inner wall of the second leg section 1*b* to achieve a friction locking of the position. Wherein, the installation of the elastic sleeve 9 can prevent the expandable block 8 from loosening and also provides the expandable block 8 with a space and an ability to work elastically, the structural design of which is ingenious and reliable; when it is necessary to release the position to facilitate the activity of the leg section, it operates said control assembly 3 to rotate the transmission lever 4 in the other direction to drive the transmission seat 5 upward with respect to the fixed seat 7, and the extrusion sleeve 6 is released from the expandable block 8 which is closed under the action of the elastic sleeve 9 to achieve the position release and to facilitate the adjustment of the leg section.

In the tripod of the present embodiment, multiple first extrusion bevels 12 are provided at equal intervals around a periphery of a lower edge of said extrusion block 6, and the first extrusion bevels 12 correspond to the expandable blocks 8 one by one.

In the tripod of the present embodiment, a lower outer edge of said transmission seat 5 is provided with an annular table 13, and multiple second extrusion bevels 14 are provided at equal intervals around an outer periphery of an upper edge of said annular table 13, and the second extrusion bevels 14 correspond to the expandable blocks 8 one by one.

Wherein, an upper end and a lower end of the inner sidewall of the expandable block 8 are provided with an abutting bevel 15.

Specifically, the first extrusion bevel 12 is cooperatively slid into contact with the abutting bevel 15 at the upper end of an expandable block 8, and the second extrusion bevel 14 is cooperatively slid into contact with the abutting bevel 15 at the lower end of the expandable block 8, which facilitates abutting pressure on an expandable block 8 to cause the expandable block 8 to expand.

In the tripod of the present embodiment, an upper surface of said extrusion sleeve 6 is provided with an upper annular groove 16, which is rotatably provided with multiple balls 17, and a lower surface of said pressing deck 10 is provided with a lower annular groove 18, wherein said upper annular groove 16 corresponds to the lower annular groove 18, and the multiple balls 17 are slidably coupled to the lower annular groove 18. Specifically, the arrangement described above can make the movement of the pressing deck 10 in rotating and extruding the extrusion sleeve 6 smooth to reduce wear and tear and have a reliable structure.

In the tripod of the present embodiment, the outer walls of said expandable blocks 8 are all provided with accommodating grooves 19 for accommodating said elastic sleeves 9. Specifically, the accommodating grooves 19 accommodate and limit the elastic sleeves 9, and prevent the elastic sleeves 9 from falling off, and at the same time provide a limiting effect that facilitates the action of the elastic sleeves 9 to tighten the expandable blocks 8.

In the present embodiment, two accommodating grooves 19 are provided, which are located at the upper and lower ends of the outer wall of the expandable block 8, respectively, and two elastic sleeve 9 are provided, which are elastic rings. Specifically, the elastic sleeve 9 described above is provided with two which ensure the closing action of the expandable block 8 and its structure is reliable.

In the tripod of the present embodiment, said control assembly 3 comprises a control base 20, a control shaft 21 rotatably mounted on the control base 20, a control bevel gear 22 socketed on the periphery of said control shaft 21, and a pivot handle 23 coupled to said control shaft 21; and said rotating member 33 is coupled to the control base 20;

said transmission lever 4 is provided with a transmission bevel gear 24 at a top of said transmission lever 4, which is connected to said control bevel gear 22 in an engaging transmission; and said transmission lever 4 is rotatably provided in said control base 20;

said pivot handle 23 is positioned on a periphery of said control base 20, and said pivot handle 23 is provided with a positioning assembly and a first housing 25 accommodating said positioning assembly, wherein said positioning assembly comprises a first spring 26 and a steel ball 27, and said first spring 26 is connected to an inner wall of the first housing 25 and to an outer surface of the steel ball 27 at the first spring 26 two ends, respectively, wherein the front end of said steel ball 27 protrudes from said first housing 25, and the steel ball 27 is slidably connected to the outer wall of the control base 20, and said control base 20 is provided with a snap-in recess 28 on the outer wall for snap-in engagement with said steel ball 27;

specifically, when said control assembly 3 is operated, the operator pulls said pivot handle 23, which drives said control shaft 21 to rotate and drives the transmission lever 4 to rotate through the control bevel gear 22 and the transmission bevel gear 24 in cooperation with the transmission, and the direction of rotation of the transmission lever 4 is determined by the direction of switching the pivot handle 23, it is convenient to operate the pivot handle 23 alone to control the single or multiple expandable assemblies 2 to perform the expanding and closing actions, which is easy to operate. Wherein, when the pivot handle 23 is not opened, the steel ball 27 slides against the outer wall of the control base 20, and when the pivot handle 23 is opened until the expandable assembly 2 is expanded, under the action of the first spring 26, the steel ball 27 is snapped into said snap-in recess 28 to position itself, preventing the pivot handle 23 from rotating by itself so that the structure is reliable. The snap-in recess 28 is preferably a semicircular recess, and the steel ball 27 is disengaged from the snap-in recess 28 when the user operates the pivot handle 23 to restore.

Further, in the present embodiment, the outer wall of said control base 20 is also provided with a second housing 29, said second housing 29 is equipped with a limiting assembly for limiting the pivot handle 23, and said limiting assembly comprises a second spring 30 and a limiting block 31, wherein the two ends of said second spring 30 are connected to the inner wall of the second housing 29 and one end of the limiting block 31, respectively, and the other end of the limiting block 31 protrudes from said second housing 29 and is used for limiting the pivot handle 23 by connecting to the pivot handle 23.

Specifically, when the pivot handle 23 swings downward until the lower end of the pivot handle 23 contacts the control base 20 or the first leg section 1*a*, at that time, by utilizing the elasticity of the second spring 30 and the structure of the limiting block 31, the limiting block 31 extends out of the second housing 29, and pushes up the pivot handle 23, and further limits the pivot handle 23, which is capable of locking the pivot handle 23 and preventing the pivot handle 23 from being mistakenly pulled or pulled by an external force, which is of a reliable structure; when the pivot handle 23 needs to be operated, the user only needs to press the limiting block 31 to make the limiting block 31 to retract into the second housing 29 and give way to the pivot handle 23, whereupon the pivot handle 23 can be rotated arbitrarily.

In the tripod of the present embodiment, said seat 100 is provided with a tripod center seat mechanism, and said tripod center seat mechanism comprises a locking assembly, a center seat bushing 41, a movable swing seat 42, a locking block 43, and a connecting rod 44, wherein the center seat bushing 41 is mounted on the seat, and the movable swing seat 42 is movably mounted on the top of said center seat bushing 41, wherein a first through hole is provided in said movable swing seat 42 and the connecting rod 44 is threaded through the first through hole. A lower end of the connecting rod 44 is connected to said locking assembly, and an upper end of the connecting rod 44 is connected to the locking block 43, wherein the width of said locking block 43 is greater than the width of the first through hole.

In the present embodiment, said locking assembly comprises a slider 45 and a screw 46, wherein the slider 45 is slidably provided in said center seat bushing 41 and is provided with a third extrusion bevel 47 on both sides, and said screw 46 is rotatably installed in said center seat bushing 41 and threaded in said connecting rod 44, wherein the connecting rod 44 is provided throughout with a movable slot, and said screw 46 is threaded through said movable slot, and the movable slot is in the form of an elliptical slot which facilitates upward and downward movement of the connecting rod 44 relative to the screw 46. Said locking block 43 is connected to said slider 45 through the connecting rod 44, and the screw 46 is threaded with a first compression block 48 and a second compression block 49, wherein said first compression block 48 and said second compression block 49 are located on both sides of the connecting rod 44, respectively, and slidably abutted against the inner wall of the center seat bushing 41, and said first compression block 48 and said second compression block 49 are both provided with a fourth extrusion bevel 50 cooperating with said third extrusion bevel 47, and said screw 46 is provided with a right-hand threaded section and a left-hand threaded section, wherein said first compression block 48 and second compression block 49 are threaded with the right-hand threaded section and the left-hand threaded section, respectively.

Specifically, when the movable swing seat 42 is to be locked, the screw 46 is rotated, and under the rotation of the screw 46, the first compression block 48 and the second compression block 49 can be driven away from each other or close to each other, and the third extrusion bevel 47 pushes the fourth extrusion bevel 50, causing the slider 45 and the connecting rod 44 to move downward, and the locking block 43 tightly presses the movable swing seat 42 downward to increase the frictional force between the movable swing seat 42 and the center seat bushing 41 so as to limit the swing and rotation of the movable swing seat 42, thereby positioning the movable swing seat 42. When it is necessary to release the movable swing seat 42, it is only necessary to turn the screw 46 in the opposite direction.

In the present embodiment, a top plate 51 is also provided on the movable swing seat 42, wherein a mounting screw 52 is provided on the top plate 51, which can be connected to a tripod head and photographic equipment.

The above is only a preferred embodiment of the present invention and is not a limitation of any form of the present invention. Although the present invention is disclosed in a preferred embodiment as above, it is not intended to limit the present invention, and any skilled person skilled in the art may, without departing from the scope of the technical embodiment of the present invention, use the above disclosed technical content to make some changes or modifications to the equivalent embodiment of the equivalent changes, however, any simple modifications, equivalent changes and modifications made to the above embodiment based on the technology of the present invention are within the scope of the technical embodiment of the present invention.

What is claimed is:

1. A tripod, comprising:

an angle snap-fit structure fixedly disposed on a seat of the tripod, wherein the seat is provided with a tripod center seat mechanism for mounting photographic equipment;

a rotating member, and one end of the rotating member is rotatably connected to the angle snap-fit structure and the other end of the rotating member is connected to a support leg of the tripod;

an angle control member slidably disposed on the rotating member; and the angle control member is cooperatively snap-fitting with the angle snap-fit structure to lock a corresponding angle of rotation of the rotating member relative to the angle snap-fit structure;

the support leg comprises two or more leg sections, wherein each leg section is axially movable relative to one or more of the other leg sections to lengthen or shorten the support leg;

the support leg further comprises an expandable assembly mounted on a second leg section and a third leg section, wherein the expandable assembly is capable of performing operations of an expansion and a contraction for position locking and releasing;

the support leg further comprises a control assembly mounted on a first leg section, wherein the control assembly is used configured to control the expandable assembly to expand or contract; and the support leg further comprises a transmission lever, and the control assembly is connected to the expandable assembly by means of the transmission lever and transmitting therebetween;

wherein the expandable assembly comprises a transmission seat, an extrusion sleeve, and a fixed seat, wherein the fixed seat is threadedly coupled to a periphery of a lower end of the transmission seat, and multiple expandable blocks are distributed at equal intervals around a periphery of the fixed seat, wherein the multiple expandable blocks are provided with elastic sleeves around a periphery of the expandable blocks;

the extrusion sleeve is movably coupled to a periphery of the transmission seat, and a top of the transmission seat is provided with a pressing deck that is slidably coupled to a top of the extrusion sleeve and the extrusion sleeve is configured to extrude the expandable blocks to cause the expandable blocks to expand outwardly, and a friction spacer is provided on an outer wall of the expandable blocks.

2. The tripod according to claim 1, wherein the angle snap-fit structure is provided with multiple snap catches, and the angle control member is provided with a coupling member;

the coupling member is capable of abutting against any one of the snap catches to lock the rotating member at a corresponding angle of rotation relative to the angle snap-fit structure; and the rotating member is provided with a locking screw, and the angle control member is provided with a movable guide groove therethrough, wherein the locking screw passes through the movable guide groove of the angle control member and is screwed to the rotating member, and the locking screw is provided with multiple disc spring spacers between the locking screw and the angle control member to press against the angle control member.

3. The tripod according to claim 1, wherein multiple first extrusion bevels are provided at equal intervals around a periphery of a lower edge of the extrusion block, and the first extrusion bevels correspond to the expandable blocks one by one.

4. The tripod according to claim 1, wherein a lower outer edge of the transmission seat is provided with an annular table, and multiple second extrusion bevels are provided at equal intervals around an outer periphery of an upper edge of the annular table, and the second extrusion bevels correspond to the expandable blocks one by one.

5. The tripod according to claim 1, wherein an upper end and a lower end of an inner sidewall of the expandable blocks are provided with an abutting bevel.

6. The tripod according to claim 1, wherein an upper surface of the extrusion sleeve is provided with an upper annular groove, which is rotatably provided with multiple balls, and a lower surface of the pressing deck is provided with a lower annular groove, wherein the upper annular groove corresponds to the lower annular groove, and the multiple balls are slidably coupled to the lower annular groove.

7. The tripod according to claim 1, wherein the control assembly comprises a control base, a control shaft rotatably mounted on the control base, a control bevel gear socketed on a periphery of the control shaft, and a pivot handle coupled to the control shaft;

the transmission lever is provided with a transmission bevel gear at a top of the transmission lever which is connected to the control bevel gear in an engaging transmission;

the pivot handle is positioned on a periphery of the control base, and the pivot handle is provided with a positioning assembly and a first housing accommodating the positioning assembly, and the positioning assembly comprises a first spring and a steel ball, wherein the first spring is connected to an inner wall of the first housing and an outer surface of the steel ball at the first spring's two ends, respectively, and a front end of the steel ball protrudes from the first housing, the steel ball is slidably connected to an outer wall of the control base, and the control base is provided with a snap-in recess on the outer wall for snap-in engagement with the steel ball; and the outer wall of the control base is also provided with a second housing, the second housing is equipped with a limiting assembly for limiting the pivot handle, and the limiting assembly comprises a second spring and a limiting block, wherein two ends of the second spring are connected to an inner wall of the second housing and one end of the limiting block, respectively, and the other end of the limiting block protrudes from the second housing and abuts the pivot handle.

8. The tripod according to claim 1, wherein the tripod center seat mechanism comprises a locking assembly, a center seat bushing, a movable swing seat, a locking block, and a connecting rod, wherein the center seat bushing is mounted on the seat, and the movable swing seat is movably mounted on a top of the center seat bushing, and a first through hole is provided in the movable swing seat and the connecting rod is threaded through the first through hole, and a lower end of the connecting rod is connected to the locking assembly, and an upper end of the connecting rod is connected to the locking block, wherein a width of the locking block is greater than a width of the first through hole.

9. The tripod according to claim 8, wherein the locking assembly comprises a slider and a screw, wherein the slider is provided with a third extrusion bevel on both sides, and the screw is rotatably installed in the center seat bushing and threaded in the connecting rod, and the locking block is connected to the slider through the connecting rod; the screw is threaded with a first compression block and a second compression block, and the first compression block and the second compression block is located on both sides of the connecting rod, respectively, and both of the first compression block and the second compression block are provided with a fourth extrusion bevel cooperating with the third extrusion bevel, and the screw is provided with a right-hand threaded section and a left-hand threaded section, wherein the first compression block and second compression block being threaded with the right-hand threaded section and the left-hand threaded section, respectively.

* * * * *